UNITED STATES PATENT OFFICE 2,676,186

PREPARATION OF SUCCINIC ACID

Andrew P. Dunlop, Riverside, and Shelbert Smith, Chicago, Ill., assignors to The Quaker Oats Company, Chicago, Ill., a corporation of New Jersey No Drawing. Application April 18, 1952, Serial No. 283,128

5 Claims. (Cl. 260—537)

The present invention relates to the oxidation of levulinic acid, particularly while the same is in vapor form, and for the particular purpose of producing therefrom succinic acid.

To the best of our knowledge the oxidation of levulinic acid heretofore has been limited to methods employing a chemical oxidizing agent such as hypohalites and nitric acid; methods which are expensive because of the chemicals consumed.

It is accordingly an object of the present invention to provide a method which obviates the disadvantages of the prior art. It is another object of our invention to provide a process for the preparation of succinic acid or the anhydride by the oxidation of levulinic acid using air as an oxidizing agent. Other objects of this invention will be apparent from the description and the hereunto appended claims. It is to be understood that the term "succinic acid" as used herein includes both the anhydride and the hydrate. Under the reaction conditions the anhydride and the hydrate thereof are often formed together.

In accordance with one aspect of the present invention, a gas such as a gas containing free oxygen or nitrogen is passed through a vessel containing levulinic acid which is heated by any suitable means such as a glycerine or a Wood's metal bath. The temperature of the bath is maintained above 100° C. preferably within a temperature range of 125° to 135° C. Immediately after passing through the vessel containing the levulinic acid the levulinic acid-laden gas is passed over a vanadium pentoxide catalyst which is heated to a proper temperature by any suitable means. When nitrogen is used it is, of course, necessary to add oxygen to the levulinic acid-laden nitrogen prior to passing it over the catalyst. In addition to the method outlined above for introducing levulinic acid vapors into the catalyst chamber, suitable alternative methods comprise the vaporization of levulinic acid, admixing the resulting vapors with the free oxygen containing gas, or the levulinic acid may be injected into the stream of free oxygen-containing gas as a fine spray after which the gaseous mixture is passed over the catalyst. Whichever method is used the oxidation products are condensed and the succinic acid recovered. By regulation of conditions, it is possible to isolate succinic acid or, alternatively, succinic anhydride as the product.

While we have operated at temperatures ranging from 200° to 400° C. we prefer, for best results, to operate within the temperature range of about 365° to 390° C. The actual temperature to be used depends upon the activity of the catalyst and on the time of contact between the reaction mixture of gases and the catalyst. When working at comparatively low temperature, e. g. within the range of 200° to 325° C., the time of contact must be longer than at the preferred temperatures. In general, the time of contact may vary considerably without materially affecting the yield of succinic acid. As a general rule it is desirable that the time of contact be long enough to insure that the starting material introduced is wholly, or almost wholly oxidized before leaving the catalyst zone. The concentration of levulinic acid in the mixture to be passed over the catalyst may also vary to a considerable extent. Generally, it is preferable to provide for an excess of oxygen, air, or other gas containing free oxygen.

Although various types of oxidation contact catalyzers may be used and prepared for use in accordance with procedures well known to those skilled in the art, we prefer to use a catalyzer prepared by evaporating a mixture consisting of a suitable carrier and an aqueous solution of ammonium metavanadate to dryness with continuous agitation after which the coated and/or impregnated carrier is activated by heating it at a temperature of 350 to 375° C. for a period of about two hours while rapidly passing a current of air over it. Suitable carriers include pumice, alumina, silica gel, aluminum or nickel pellets.

In order to disclose the nature of the present invention still more clearly, the following illustrative examples will be hereinafter described in which "parts by weight" bear the same relation to "parts by volume" as do grams to cubic centimeters.

Preparation of the catalyst

Ninety parts by volume of pumice stone (8–10 mesh) was added to a solution consisting of 22.5 parts by weight of ammonium metavanadate dissolved in 25 parts by volume of water. The resulting slurry was evaporated to dryness on a steam bath with stirring, placed in the catalyst chamber, decomposed at 350-375° C. in a stream of air for 2 hours and used as a catalyst as described below.

Oxidation of levulinic acid

A series of experiments were run in which nitrogen at a temperature of about 190° C. was passed through a vessel containing levulinic acid which was heated to a temperature of about 125°

C. by means of an electrically-heated glycerine bath. After admixing oxygen at a temperature of about 180° C. with the levulinic acid-laden nitrogen the resulting gaseous mixture was passed through the catalyst chamber, at the temperatures listed below.

| Temp., ° C. | Yield of succinic acid, percent |
|---|---|
| 275 | 48 |
| 300 | 54 |
| 325 | 50 |
| 350 | 70 |
| 375 | 83 |
| 400 | 81 |

Although the present invention has been described in conjunction with preferred embodiments, it is to be understood that many modifications and variations may be resorted to without departing from the spirit and scope of the invention, as those skilled in the art will readily understand, accordingly applicants claim:

1. A process for the production of succinic acid from levulinic acid, which comprises passing levulinic acid vapors admixed with oxygen over a vanadium pentoxide catalyst suspended upon a carrier at a temperature above 200° C.

2. A process for the production of succinic acid from levulinic acid, which comprises passing levulinic acid vapors admixed with oxygen over a vanadium pentoxide catalyst suspended upon a carrier at a temperature of 365° to 390° C.

3. A process for the production of succinic acid from levulinic acid, which comprises passing levulinic acid vapors admixed with oxygen over a vanadium pentoxide catalyst suspended upon pumice as a carrier at a temperature of 365° to 390° C.

4. A process for the production of succinic acid from levulinic acid, which comprises passing levulinic acid vapors admixed with a free-oxygen containing gas over a vanadium pentoxide catalyst suspended upon a carrier at a temperature above 200° C.

5. A process for the production of succinic acid from levulinic acid, which comprises passing levulinic acid vapors admixed with oxygen over a vanadium pentoxide catalyst at a temperature above 200° C.

References Cited in the file of this patent

UNITED STATES PATENTS

| Number | Name | Date |
|---|---|---|
| 2,005,183 | Flemming et al. | June 18, 1935 |
| 2,081,272 | Foster | May 25, 1937 |
| 2,533,620 | Polly | Dec. 12, 1950 |

OTHER REFERENCES

Ponsford et al., Biochem. J., vol. 28, pp. 892–897 (1934).